United States Patent [19]

Gaigl

[11] Patent Number: 4,712,437
[45] Date of Patent: Dec. 15, 1987

[54] GEAR FOR TRANSFORMING ROTARY MOTION TO RECIPROCATORY MOTION

[75] Inventor: Karl J. Gaigl, Stockach, Fed. Rep. of Germany

[73] Assignee: Fahr-Bucher GmbH, Gottmadingen, Fed. Rep. of Germany

[21] Appl. No.: 789,081

[22] Filed: Oct. 18, 1985

[30] Foreign Application Priority Data

Oct. 19, 1984 [DE] Fed. Rep. of Germany ....... 3438363
Dec. 12, 1984 [DE] Fed. Rep. of Germany ....... 3444168

[51] Int. Cl.$^4$ ..................... F16H 21/18; F16H 21/54
[52] U.S. Cl. .......................................... 74/50; 74/104; 74/436
[58] Field of Search ............... 74/50, 104, 436, 109

[56] References Cited

U.S. PATENT DOCUMENTS

| | | | |
|---|---|---|---|
| 551,488 | 12/1895 | Christiansen | 74/109 |
| 736,965 | 8/1903 | Harris | 74/104 |
| 3,025,709 | 3/1962 | Brems | 74/436 |
| 3,270,624 | 9/1966 | Blaney | 74/104 |
| 3,605,517 | 9/1971 | Seragnoli | 74/436 |
| 3,655,020 | 4/1972 | Van Slooten | 74/436 |
| 3,680,399 | 8/1972 | Brems | 74/436 |
| 3,945,505 | 3/1976 | Frisbie et al. | 74/436 |
| 4,312,381 | 1/1982 | Ratner | 74/436 |
| 4,580,462 | 4/1986 | Rehlander | 74/109 |

FOREIGN PATENT DOCUMENTS 116539 6/1918 United Kingdom .................. 74/436

Primary Examiner—George H. Krizmanich
Attorney, Agent, or Firm—Bachman & LaPointe

[57] ABSTRACT

In a gear for the transmission and/or transformation of the changing or alternating rotary movement of a drive, a cam plate is associated with the latter and has a guidance channel for receiving the said driver. The driver rotates in a radius about a center, a further driver being connected to said center and engages in at least one reception groove of the cam plate, when the first driver is disengaged from the guidance channel.

8 Claims, 3 Drawing Figures

GEAR FOR TRANSFORMING ROTARY MOTION TO RECIPROCATORY MOTION

The present invention relates to a gear for the transmission and/or transformation of the alternating or changing rotary movement of a driver.

The so-called crank gear is known, in which a slider crank reverses the movement of a piston via a connecting rod into the rotary movement of a crank. Such driving mechanisms are generally used in reciprocating engines.

The so-called stepping gear is also known, which is used for converting a continuous motion into an intermittent motion. A stopping effect is e.g. produced in that mechanism links are periodically disengaged and the inoperative state can then be secured by a locking mechanism, which once again requires separate elements and members.

It is also known to so construct a driver for a driving rod, that it only describes a semi-circle, i.e. performs a changing or alternating rotary movement.

The aim of the inventor has been to develop a novel gear, which has an extremely simple construction, in which the driver functions with alternating rotary movements and in which it is possible to make use of the advantages of the crank gear, namely, acceleration after one dead center and deceleration up to the next dead center. It is also to be possible for the driver to be disengaged with respect to a transmission member, without it leading to a disturbance of the sequence of the motion transformation or transmission.

According to the invention this problem is solved in that a cam plate is associated with the driver and said plate has a guidance channel for receiving said driver.

According to the invention, the driver is not fixed to the cam plate or in the guidance channel and instead slides therein. Preferably the guidance channel has a linear central axis, which vertically meets the axis when the driver is in the end position.

The actual driver rotates about a center point, to which a further driver is connected and has the function of engaging in a reception groove of the cam plate in the particular dead center of the first driver. The reception groove can be arranged in a random manner on the cam plate and its position is determined by the arrangement of the further driver about the center point. It is preferably arranged so that it is displaced by 180° with respect to the center point, because the driver and reception groove do not interfere with one another at this point during the rotary movement. The reception groove has an axis, whose radius corresponds to the radius of the second driver about the center point. If the first driver is now decelerated in the dead center, but as a result of its rotary oscillation becomes disengaged from the guidance channel, then the second driver has already slid into a reception groove and consequently maintains the cam plate precisely in the same position.

A reception groove constructed in this way is preferably arranged on either side in mirror inverted manner with respect to the guidance channel for the first driver, so that the other driver engages in such a reception groove during each changing rotary movement of the driver.

In the individual case, it is sufficient if the two drivers are arranged on a common axis. However, it can be more favorable to arrange them on a rotating disc and construct them as rolls, which roll along the webs or walls of the guidance channel or the reception grooves.

With the aid of this very simply constructed gear, it is possible to accurately control and set the transmission or transformation of a changing rotary movement. The special advantage of the gear is that it can function very rapidly and is subject to little wear, because a driver roll always keeps the cam plate in the correct position, when the other driver roll is disengaged or slides back into the guidance channel or reception groove.

Further advantages, features and details of the invention can be gathered from the following description of a preferred embodiment relative to the drawings wherein show:

Figure 1:
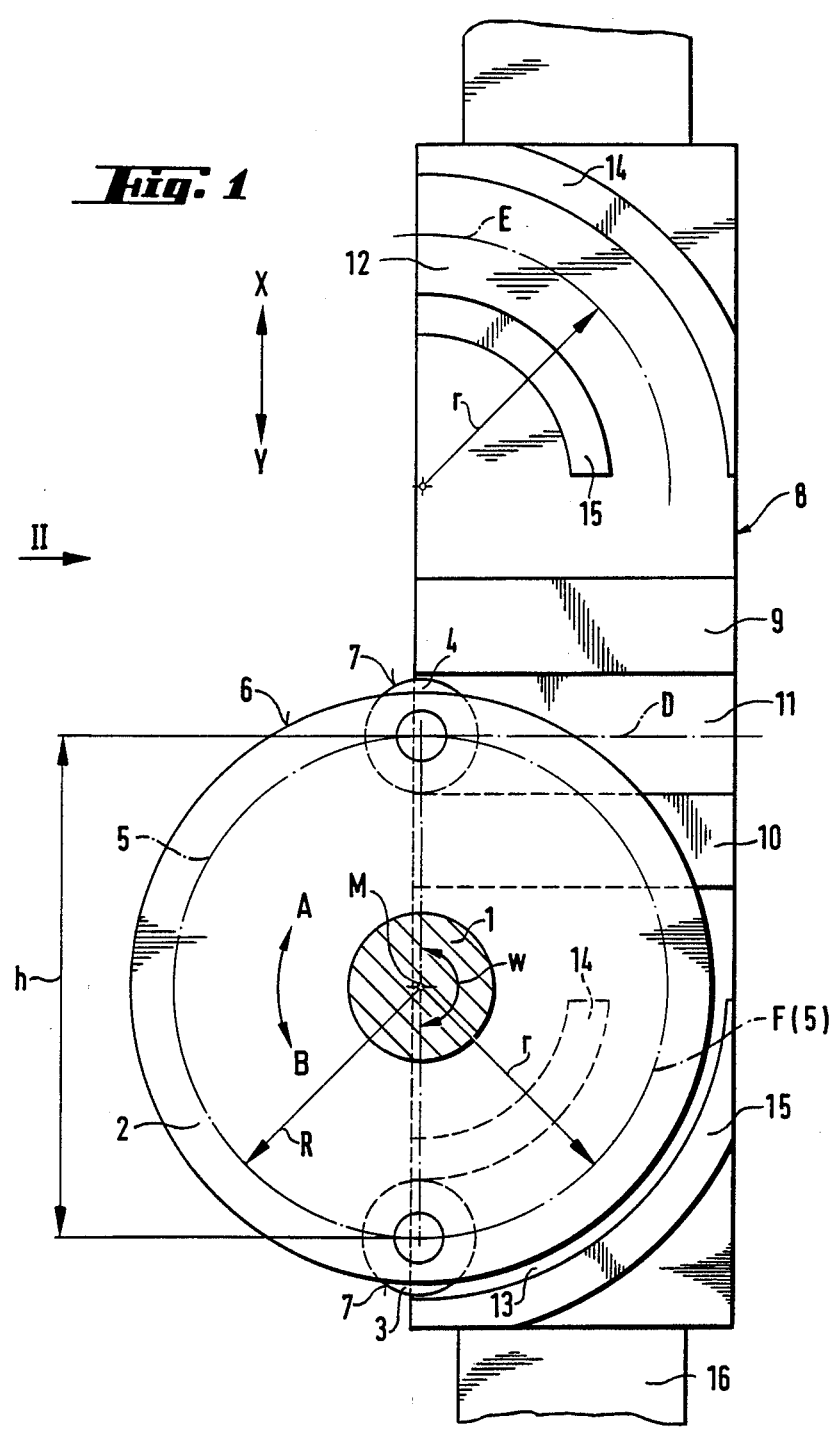
FIG. 1 is a plan view of a gear according to the invention.
Figure 2:
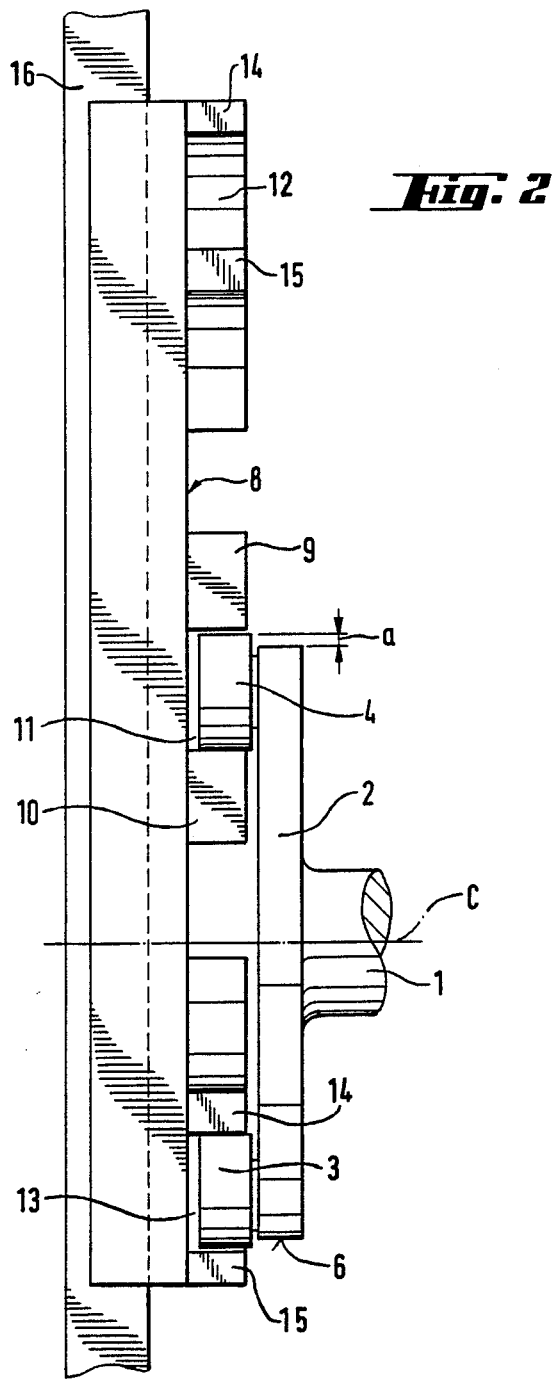
FIG. 2 is a side view of the gear according to FIG. 1.

A rotating disc 2 arranged on a shaft 1 has two driver rolls 3, 4 which are mounted at an angle w of 180° about a center M close to the circumference 6 of disc 2 on the same circle 5 and in the represented embodiment project by a small amount a over the circumference 6 of rotating disc 2 by the roll face 7. Simultaneously center M passes through axis C of shaft 1.

A cam plate 8 is associated with the rotating disc and is centrally provided with a guidance channel 11 defined by two webs 9 and 10 and in the embodiment according to FIG. 1 is occupied by the driver roll 4. In mirror inverted manner on either side of the central axis D of guidance channel 11 are in each case provided a further reception groove 12, 13, which are formed by the particular groove walls 14, 15, whose center lines or axes E, F in each case describe a quadrant, whose radii r coincide in the present embodiment with the radius R of the circle 5. However, this is not absolutely necessary and in fact r can have a different size.

Figure 3:
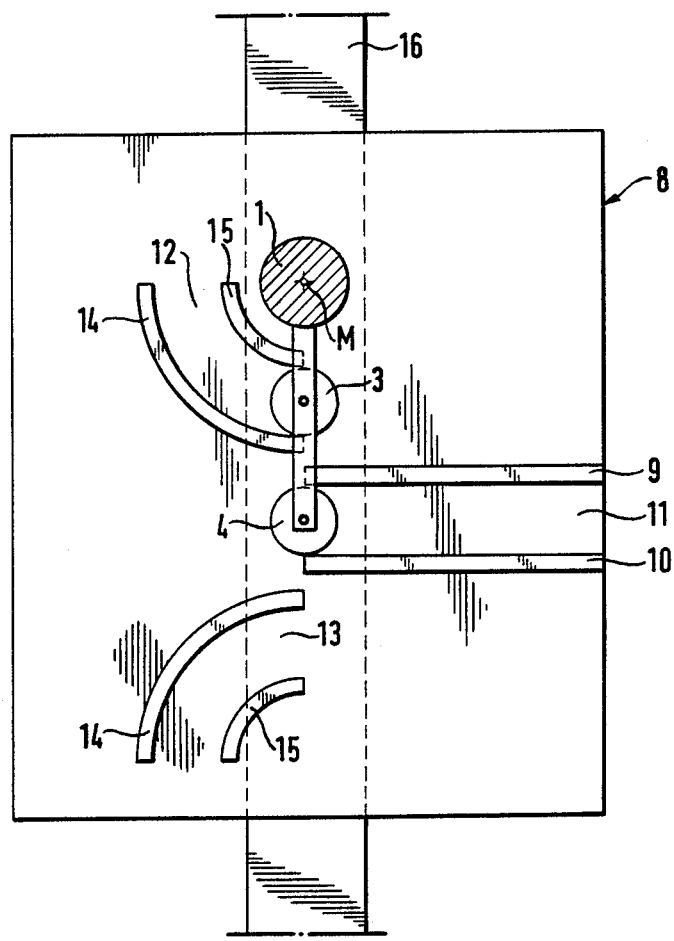
FIG. 3 is another embodiment of a gear according to FIG. 1.

Angle w can also have a value differing from 180° and can in fact be 0°, so that drivers 3, 4 are located on one axis on the same side of center point M (FIG. 3). The reception grooves 12, 13 are then correspondingly arranged on the cam plate 8 in mirror inverted image on either side of guidance channel 11 as in FIG. 1. The advantage of the arrangement displaced by an angle of 180° is the use of only one side of the axis connecting drivers 3, 4 with center M, whereas a change of angle w leads to a widening of cam plate 8 over and beyond said axis. In addition, due to the more favorable weight distribution, the torque is not impaired.

If rotating disc 2 is now rotated via shaft 1 in rotation direction A, cam plate 8 moves on a guidance rail 16 in direction y. Following a 90° rotation, driver roll 4 has passed through guidance channel 11 to the maximum extent and reverses its sliding direction through guidance channel 11 until it assumes the dead center, which is indicated by driver roll 3 in FIG. 1. Cam plate 8 has now moved a distance in the direction y substantially equal to the length h, which corresponds to the double radius r. Driver roll 3 simultaneously slides in reception groove 12 and holds cam plate 8 in this position, even if driver roll 4 passes out of the guidance channel 11 through its rotary oscillation and rotating disc 2 continues to rotate by a portion. Driver roll 3 merely follows the axis E, so that there is no change to the position of cam plate 8.

If rotating disc 2 is moved in the opposite direction B, driver roll 3 leaves reception groove 12 and driver roll 4 is simultaneously inserted in guidance channel 11. Cam plate 8 is moved in direction x up to the initial position (FIG. 1) or the dead center there. At the same time, the driver roll 3 enters the other reception groove 13 again, so that here again cam plate 8 is held in position even if the rotating disc 2 moves on and driver roll 4 slides out of guidance channel 11.

For example, cam plate 8 actuates a simple driving rod, teeth on the rack meshing with the cam plate, a further toothed gear or the like.

What is claimed is:

1. A gear for transforming or transmitting alternating rotary movement of a drive into linear movement which comprises: a first driver which rotates in a first radius about a center; a cam plate having a guidance channel for receiving the first driver and at least one reception groove; a second driver which rotates in a second radius about said center; said second driver engaging said at least one reception groove when the first driver is disengaged from said guidance channel and each said reception groove has an axis with a radius about a center point which corresponds to said second radius, whereby said cam plate moves linearly along a first axis as said first driver is rotated about said center and moves along said guidance channel.

2. A gear according to claim 1 wherein said second driver is engaged along an axis between the first driver and the center and at least two reception grooves are provided on either side of the guidance channel so that said second driver slides into one of said reception grooves when the first driver is disengaged from the guidance channel.

3. A gear according to claim 1 wherein said second driver, rotated by an angle about the center, is displaced with respect to the first driver, and at least two reception grooves on the cam plate are arranged on opposite sides of the guidance channel so that the second driver slides into one of the reception grooves when the first driver is disengaged from the guidance channel.

4. A gear according to claim 3 wherein the second driver is displaced by roughly 180° from the center.

5. A gear according to claim 1 wherein the reception grooves are provided with each having an axis, the radii of each reception groove passing around a center point which is located on a straight line which also passes through said center point.

6. A gear according to claim 5 wherein the two reception grooves are arranged in mirror inverted manner at the same distance from an axis of the guidance channel and the reception groove radius corresponds to the first radius of the first driver.

7. A gear according to claim 1 wherein two reception grooves are provided and wherein the first and second drivers are arranged on a rotating disc, said disc rotating intermittently by about 180° in a plurality of rotation directions and towards the end of said one rotating direction one of said drivers always engages with one of the reception grooves.

8. A gear according to claim 1 wherein the first driver and the second driver comprise rolls, which roll along webs of the guidance channel and on walls of the reception groove.

* * * * *